US012189366B2

(12) United States Patent
Shao et al.

(10) Patent No.: US 12,189,366 B2
(45) Date of Patent: Jan. 7, 2025

(54) INDUSTRIAL INTERNET OF THINGS WITH SENSING NETWORK PLATFORM IN POST-SUB-PLATFORM TYPE AND CONTROLLING METHOD THEREOF

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Yongzeng Liang, Chengdu (CN); Yong Li, Chengdu (CN); Bin Liu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 375 days.

(21) Appl. No.: 17/808,996

(22) Filed: Jun. 25, 2022

(65) Prior Publication Data
US 2023/0418262 A1 Dec. 28, 2023

(51) Int. Cl.
*G05B 19/4155* (2006.01)

(52) U.S. Cl.
CPC ............ *G05B 19/4155* (2013.01); *G05B 2219/31372* (2013.01)

(58) Field of Classification Search
USPC .................................................. 700/95–96
See application file for complete search history.

(56) References Cited

U.S. PATENT DOCUMENTS

2002/0035450 A1* 3/2002 Thackston ......... G05B 19/4099
703/1

FOREIGN PATENT DOCUMENTS

| CN | 113523099 A | 10/2021 |
|---|---|---|
| EP | 3557339 A1 | 10/2019 |

OTHER PUBLICATIONS

Shao, Zehua, Exploration and Research on the Structure of Internet of Things, Internet of Things Technologies Reliable Transmission, 2015, 10 pages.
Shao, Zehua, The Internet of Things sense the world beyond the world, China Renmin University Press, 2017, 30 pages.
Shao, Zehua, Smart City Architecture, Internet of Things Technologies Intelligent Processing and Application, 2016, 7 pages.

* cited by examiner

*Primary Examiner* — Sean Shechtman
(74) *Attorney, Agent, or Firm* — METIS IP LLC (57) ABSTRACT

The present disclosure discloses the industrial internet of things (IoT) with a sensing network platform in a post-sub-platform type and controlling method thereof, which has adopted a form of a five-platform structure to construct an intelligent manufacturing industrial IoT. Each platform has a corresponding hardware device. As a service platform and a management platform adopt a centralized layout, while the sensing network platform adopts a post-sub-platform layout, the sensing network platform may receive large quantities of instructions issued by the management platform, and balance the coordination of various instructions at the same time, which makes the present disclosure very suitable for large-scale production lines with the requirement of high overall coordination and makes the present disclosure have strong applicability.

10 Claims, 2 Drawing Sheets

INDUSTRIAL INTERNET OF THINGS WITH SENSING NETWORK PLATFORM IN POST-SUB-PLATFORM TYPE AND CONTROLLING METHOD THEREOF

TECHNICAL FIELD

The present disclosure relates to the intelligent manufacturing technology, and specifically relates to the industrial internet of things (IoT) with a sensing network platform in a post-sub-platform type and controlling method thereof.

BACKGROUND

With the development of science and technology, the industrial IoT applied in intelligent manufacturing technology has begun to develop on a large scale. At present, the research on the industrial IoT of intelligent manufacturing technology mainly focuses on how to achieve underlying technology, which needs to develop different industrial IoT, leading to a lack of unified and standard research, and making the phenomenon of repeated development serious.

SUMMARY

The technical problem to be solved by the present disclosure is that in the existing technology, different industrial IoT are developed, which may lead to a lack of unified and standard research, and may make the phenomenon of repeated development serious. The purpose of the present disclosure is to provide the industrial internet of things with a sensing network platform in a post-sub-platform type and controlling method thereof to solve the aforesaid problem.

The present disclosure may be implemented through the following technical solutions:

In one aspect:

The industrial internet of things with sensing network platform in post-sub-platform type is provided, which includes: a user platform, a service platform, a management platform, a sensing network platform, and an object platform that interact in turn, wherein:

the user platform may be configured as a terminal device and interacts with a user;

the service platform may be configured as a first server to receive an instruction of the user platform and send it to the management platform, and to extract and process information required by the user platform from the management platform, and send it to the user platform;

the management platform may be configured as a second server to control the operation of the object platform, and to receive feedback data of the object platform;

the sensing network platform may be configured as a communication network and gateway for the interaction between the object platform and the management platform;

the object platform may be configured as production line devices and production line sensors that perform production;

the service platform and the management platform adopt centralized layout, which means that any platform uniformly receives, processes, and sends data; the sensing network platform adopts post-sub-platform layout, which means that the sensing network platform is configured with a general platform and a plurality of sub-platforms, and the plurality of sub-platforms respectively store and process data of different types or data of different receiving objects sent by the management platform, the general platform summarizes and processes data of the plurality of sub-platforms, and transmit the data to the object platform;

when the second server issues a control instruction to the object platform through the sensing network platform, the second server classifies the control instruction to obtain classified control instructions according to a communication protocol of an object receiving the control instruction;

the second server sends classified control instructions to corresponding sub-platforms of the sensing network platform and stores the classified control instructions in databases of the sub-platforms, respectively;

the sub-platforms compiles received data according to a compile rule configured in the sub-platforms and sends the compiled data to the general platform;

the general platform processes the compiled data and send it to the corresponding production line devices and the production line sensors of the corresponding object platform.

Further, the general platform may be configured with a process table corresponding to a process of the object platform; the process table represents the corresponding relationships between each stage of the process and the production line devices in the object platform;

when the general platform receives the compiled data sent by the sub-platforms, the general platform sorts the compiled data according to the process table and generates a compile instruction sequence, each of the compiled data in the compile instruction sequence corresponding to a time when each of the compiled data is issued to the corresponding production line device; and the general platform issues the compiled data to the corresponding production line device according to the time in the compile instruction sequence.

Further, the process table may be configured with the time differences of the same product reaching different production line devices;

the general platform takes a production line device that the product initially passes as a baseline device, and takes a time when the product passes the baseline device as a baseline time;

the general platform generates a time when each of the compiled data is issued to each production line device corresponding to each compiled data according to the baseline time and the time differences, and takes the time as an issuing time for each production line device; and the general platform issues each of the compiled data to the corresponding production line device according to the issuing time.

Further, when the object platform transfers production line data detected by the production line sensors in the object platform to the second server through the sensing network platform, the general platform of the sensing network platform receives the production line data;

the general platform establishes the corresponding relationship between the production line devices and the production line data according to the process table, and sends the production line data to corresponding sub-platforms according to the corresponding relationship;

each of the sub-platform decodes the received production line data and sends it to the second server.

Further, when the second server receives the decoded production line data, the second server sends the decoded production line data to the first server;

the first server integrates the decoded production line data, forms a production data set, and sends the production data set to the terminal device.

In one aspect:

A controlling method of the industrial IoT with sensing network platform in post-sub-platform is provided. The controlling method may be applied to a user platform, a service platform, a management platform, a sensing network platform, and an object platform that interact in turn, wherein:

the user platform may be configured as a terminal device and interacts with the user;

the service platform may be configured as a first server to receive the instructions of the user platform and send it to the management platform, and to extract and process information required by the user platform from the management platform, and send it to the user platform;

the management platform may be configured as a second server, to control the operation of the object platform, and to receive the feedback data of the object platform;

the sensing network platform may be configured as a communication network and gateway for the interaction between the object platform and the management platform;

the object platform may be configured as the production line device and production line sensor that perform production;

the service platform and the management platform adopt centralized layout, which means that any platform uniformly receives, processes, and sends data; the sensing network platform adopts post-sub-platform layout, which means that the sensing network platform is configured with a general platform and a plurality of sub-platforms, the plurality of sub-platforms respectively store and process the data of different types or different receiving objects sent by the management platform, and the general platform summarizes and processes the data of the plurality of sub-platforms, and transmit data to the object platform;

the method includes:

when the second server issues control instructions to the object platform through the sensing network platform, classifying, by the second server, the control instruction according to a communication protocol of an object receiving the control instruction;

by the second server, sending the classified control instructions to the corresponding sub-platforms of the sensing network platform and storing the instructions in the databases of the sub-platforms;

by the sub-platforms, compiling the received data according to a compile rule configured in the sub-platforms and sending the compiled data to the general platform;

by the general platform, processing the compiled data and sending it to the corresponding production line devices and the production line sensors of the object platform.

Further, the general platform may be configured with a process table corresponding to process of the object platform; the process table represents a corresponding relationship between stages of the process and the production line devices of the object platform;

when the general platform receives the compiled data sent by the sub-platforms, the general platform sorts the compiled data according to the process table and generates a compile instruction sequence, each of the compiled data in the compile instruction sequence corresponding to a time when each of the compiled data is issued to the corresponding production line device;

the general platform issues each of the compiled data to the corresponding production line device according to the time in the compile instruction sequence.

Further, the process table may be configured with time differences of a same product reaching different production line devices;

the general platform takes a production line device that the product initially passes as a baseline device, and takes a time when the product passes the baseline device as a baseline time;

the general platform generates a time when each of the compiled data is issued to each corresponding production line device according to the baseline time and the time differences and takes the time as an issuing time for each production line device;

the general platform issues each of the compiled data to the corresponding production line device according to the issuing time.

Furthermore, when the object platform transfers production line data detected by the production line sensors of the object platform to the second server through the sensing network platform, the general platform of the sensing network platform receives the production line data;

the general platform establishes a corresponding relationship between the production line devices and the production line data according to the process table and sends the production line data to corresponding sub-platforms according to the corresponding relationship;

each of the sub-platforms decodes the received production line data and sends it to the second server.

Further, when the second server receives the decoded production line data, the second server sends the data to the first server;

the first server integrates the decoded production line data, forms a production data set, and sends the production data set to the terminal device.

Compared with the existing technology, the present disclosure has the following advantages and beneficial effects.

The industrial IoT with a sensing network platform in a post-sub-platform type and controlling method thereof of the present disclosure are provided, which has adopted a form of a five-platform structure proposed by the inventor to construct an intelligent manufacturing industrial IoT. Each platform has a corresponding hardware device. As a service platform and a management platform adopt a centralized layout, while the sensing network platform adopts a post-sub-platform layout, the sensing network platform may receive large quantities of instructions issued by the management platform, and balance the coordination of various instructions at the same time, which makes the present disclosure very suitable for large-scale production lines with the requirement of higher overall coordination and makes the present disclosure have strong applicability.

BRIEF DESCRIPTION OF THE DRAWINGS

The drawings of the disclosure are used to provide further understanding for embodiments of the present disclosure, and should not limit the embodiments of the present disclosure, wherein.

DETAILED DESCRIPTION

To make the purposes, technical solutions, and advantages of the present disclosure clearer, the following will perform more detailed explanation on the present specification with the combination of embodiments and the drawings. The illustrative implementation mode and the explanation of the present disclosure are used merely to explain the present disclosure, and should not limit the present disclosure. The terminology used herein is for the purposes of describing particular examples and embodiments only and is not intended to be limiting. As used herein, the singular forms "a," "an," and "the" may be intended to include the plural forms as well, unless the context clearly indicates otherwise; and the plural forms may be intended to include the singular forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

EMBODIMENTS

Figure 1:
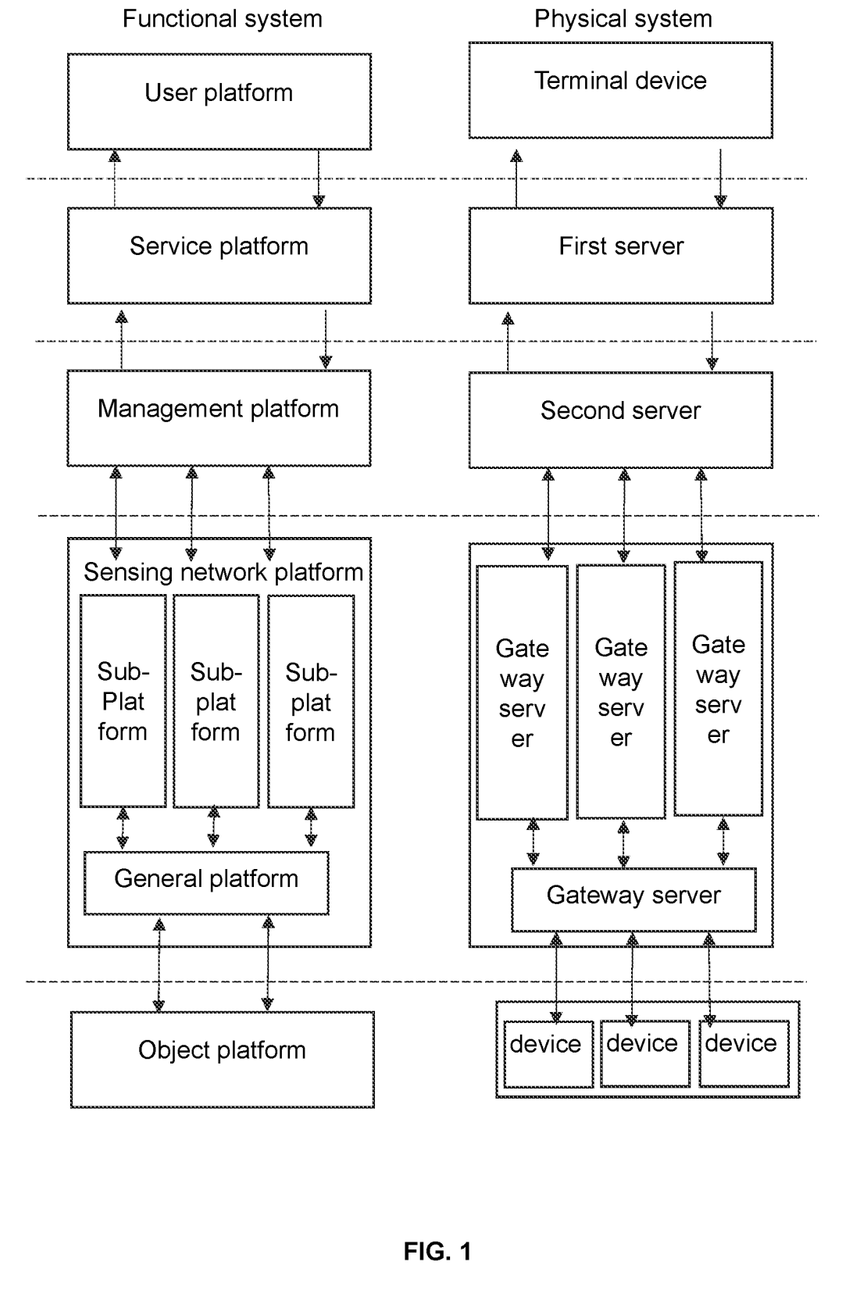
FIG. 1 is a schematic diagram illustrating a structure of the embodiments of the present disclosure.

To facilitate the explanation of the above-mentioned intelligent manufacturing industrial IoT system, please refer to FIG. 1, which provides a communication structure diagram of the industrial internet of things with a sensing network platform in a post-sub-platform type according to the embodiments of the present disclosure. The industrial internet of things with the sensing network platform in the post-sub-platform type may include a user platform, a service platform, a management platform, a sensing network platform, and an object platform that interact in turn.

The user platform may be configured as a terminal device and interacts with the user.

The service platform may be configured as a first server to receive the instructions (or an instruction) of the user platform and send it to the management platform, and to extract and process information required by the user platform from the management platform, and send it to the user platform.

The management platform may be configured as a second server to control the operation of the object platform, and to receive the feedback data of the object platform.

The sensing network platform may be configured as a communication network and gateway for the interaction between the object platform and the management platform.

The object platform may be configured as the production line devices and production line sensors that perform production.

The service platform and the management platform adopt centralized layout, which means that any platform uniformly receives, processes, and sends data; the sensing network platform adopts post-sub-platform layout, which means that the sensing network platform is configured with a general platform and a plurality of sub-platforms, and the plurality of sub-platforms respectively store and process the data of different types or data of different receiving objects sent by the management platform, the general platform summarizes and processes the data of the plurality of sub-platforms, and transmit data to the object platform.

When the second server issues a control instruction to the object platform through the sensing network platform, the control instruction may be classified according to the communication protocol of an object receiving the control instruction.

The second server sends the classified control instructions to the corresponding sub-platforms of the sensing network platform and stores the instructions in the databases of the sub-platforms.

The sub-platform compiles the received data according to a compile rule configured in the sub-platforms and then send the data to the general platform.

The general platform processes the compiled data and sends it to the corresponding production line devices and the corresponding production line sensors of the object platform.

In some specific embodiments, the user platform may be a desktop, a tablet, a laptop, a mobile phone, or other electronic devices that may realize data processing and data communication, which is not limited here.

In specific embodiments, the first server and the second server may adopt single servers or server clusters, which is not limited here. It should be understood that the data processing process mentioned in the embodiments of the present disclosure may be performed by the processor of the server, and the data stored on the server may be stored on the server's storage device, such as hard disks and other memories.

In specific embodiments, the sensing network platform may adopt a plurality of groups of gateway servers, or a plurality of groups of intelligent routers, which is not limited here. It should be understood that the data processing process mentioned in the embodiments of the embodiments of the present disclosure may be performed through a processor of a gateway server, and the data stored in the gateway server may be stored on the storage device of the gateway server, such as hard disks, SSD and other memory.

In existing technologies, for the construction of some large-scale production lines, due to the complexity situation of the production line devices (i.e., the object platform), the communication protocols or decoding modes corresponding to different devices may often be very different. The current solution is mainly to uniformly transform these communication protocols or encoding processes through some special devices. If there are many production line devices to be transformed, it may be very easy to cause excessive load of these special devices and affect the work of the production line. The more production line devices there are, the more complex the work of thread distribution and token allocation of these special devices may be, and the complexity may also affect the stability of the entire operation of the intelligent manufacturing industrial IoT.

When the embodiment is implemented, the design of post-sub-platform may be adopted to the sensing network platform, that is, the sensing network platform respectively receives different types of instructions or data from the second server through a plurality of sub-platforms. The classification process may be calculated and processed by the second server, and the different types in the present embodiments refers to different communication protocols or decoding modes. It should be understood that those skilled in the art may choose suitable classification mode according to the content of the present embodiment.

In the present embodiment, the sub-platform and the general platform adopt the gateway server or gateway server cluster, which is not limited here. The classified instructions or data may be sent to the corresponding sub-platforms, respectively. The main role of the sub-platform may be reflected in performing the specific processing on different types of instructions or data. The specific processing mainly includes transcoding and protocol transfer, etc. As each sub-platform processes one type of data or instruction, high integration may be achieved, and the calculation process may be relatively fast, which may effectively improve the efficiency of code transfer.

The general platform may be responsible for summarizing the encoded data transferred by the sub-platforms. As some production lines have high requirements for the issuing time or coordination of different instructions, the general platform may summarize all data that needs to be issued to the object platform, which may effectively improve the production stability of the production line.

The industrial internet of things with the sensing network platform in the post-sub-platform type of the embodiments of the present disclosure has adopted a form of a five-platform structure by the inventor previously proposed to construct the intelligent manufacturing industrial IoT. Each platform has a corresponding hardware device. As the service platform and the management platform adopt a centralized layout, while the sensing network platform adopts a post-sub-platform layout, the sensing network platform may receive large quantities of instructions issued by the management platform, and balance the coordination of various instructions at the same time, which makes the embodiments very suitable for large-scale production lines with the requirement of high overall coordination and makes the embodiments have strong applicability.

In one embodiment, the general platform may be configured with a process table corresponding to a process of the object platform; the process table represents the corresponding relationship between various stages (or link) of the process and the production line devices in the object platform;

When the general platform receives the compiled data sent by the sub-platforms, the general platform sorts the compiled data according to the process table and generates a compile instruction sequence; each compiled data in the compile instruction sequence corresponds to a time when each compiled data is issued to the corresponding production line device.

The general platform issues each of the compiled data to the corresponding production line device according to the time in the compile instruction sequence.

When the embodiment is implemented, the inventor found that for some production lines, the process may be comparatively complicated, there may be more devices on the same production line, and different production line devices need to be coordinated. Exemplarily, for a gas meter production line, a shell needs to be stamped, and the shell formed after stamping needs to be installed with corresponding accessories in virous stages of the downstream production line. That is to say, when the stamping parameters change, the shape of the shell may have certain changes, which requires adjustment in virous stages of the downstream production lines to adapt to the change.

In the embodiments, when the parameters of a certain production line are adjusted, the second server may generate a whole set of adjustment scheme of production line device parameters and issue to each sub-platform. After summarizing the compiled data from each sub-platform, the general platform may sort all data according to the process table preset in the general platform. The purpose of the sorting is to clarify the time of modification for parameters corresponding to each device. Exemplarily, for a gas meter production line, the processing parameters need to be modified during stamping. To avoid production line shutdown, an online parameter modification may be adopted. At a certain moment the stamping device completed the parameter modification, the parameter of the shell may change, while other production devices are still processing the unchanged shell until the changed shell reaches the production devices. Thus, time differences exist in the process. To solve the problem of online parameter update of the production lines brought by the time differences, the embodiment compiles the issuing time of each instruction in the instruction sequence through the process table, which effectively improves the efficiency of production line modification, and avoided the loss brought by the shutdown when modifying the parameters.

In one embodiment, the process table may be configured with the time differences of the same product reaching different production line devices.

The general platform takes a production line device that the product initially passes as a baseline device, and takes a time when the product passes the baseline device as a baseline time.

The general platform generates the time a time when each of the compiled data is issued to each corresponding production line device and takes the time as an issuing time for each production line device according to the baseline time and the time differences.

The general platform issues the compiled data to the corresponding production line device according to the issuing time.

When the embodiment, as a more specific implementation, is implemented, accurate time adjustments may be performed through configuring the time differences in the process table. The time differences may be automatically generated according to the data collected by production line sensors in the object platform, or may be set manually. In the embodiment, the product should be one or more assembled components. Exemplarily, in the gas meter production line, a sheet before stamping, a shell after stamping, and a shell installed with some components may be regarded as the same product. The production line device the product initially passes may generally be the head device at the first of production line, for example, a suction cup manipulator that transports the sheets to the production line. Taking the device as a baseline device and taking a time when the product passes the baseline device as a baseline time may help to calculate the issuing time corresponding to each of the devices after the base device. The general platform may issue the corresponding data according to the calculated issuing time.

In one embodiment, when the object platform transfers the production line data detected by the production line sensors of the object platform to the second server through the sensing network platform, the general platform of the sensing network platform receives the production line data.

The general platform establishes the corresponding relationship between the production line devices and the production line data according to the process table, and sends the production line data to corresponding sub-platforms according to the corresponding relationship.

Each of the sub-platforms decodes the received production line data and sends it to the second server.

When the embodiment is implemented, it also provides a solution for data uplink of the object platform, which provides a closed loop for the data flow of this embodiment. The up-link data in the object platform may mainly be the data detected by the production line sensors in (or of) the object platform. The data may be summarized in the general platform, decoded, and transmitted through corresponding sub-platform after being compiled by the process table.

In one embodiment, when the second server receives the decoded production line data, it sends the data to the first server.

The first server integrates the decoded production line data, forms a production data set, and sends the production data set to the terminal device.

Figure 2:
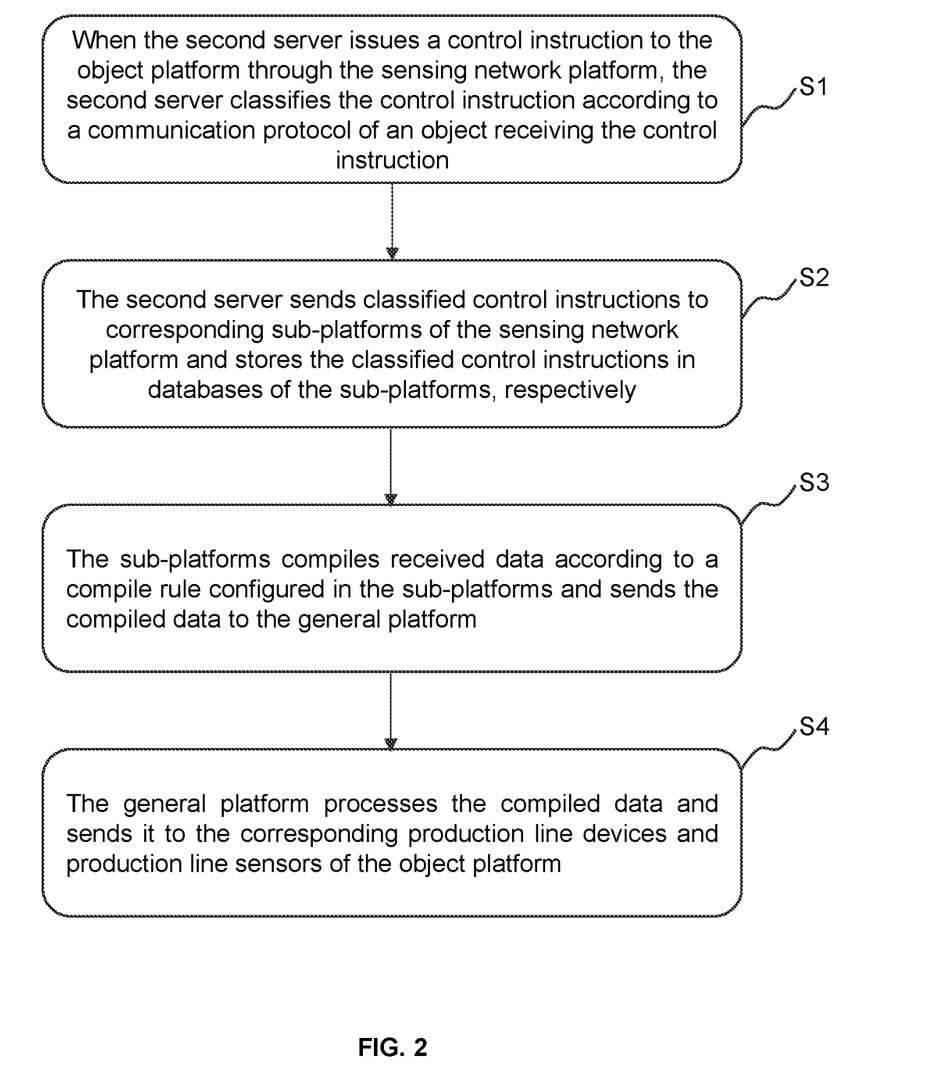
FIG. 2 is a flowchart illustrating the operations of a method of the embodiments of the present disclosure.

On the basis of the above-mentioned content, please refer to FIG. 2, which is a schematic flowchart illustrating the controlling method of the industrial internet of things (IoT) with a sensing network platform in a post-sub-platform type according to the embodiments of the present disclosure. The method may be applied to the industrial internet of things (IoT) with the sensing network platform in the post-sub-platform type in FIG. 1. Furthermore, the controlling method may specifically include the content described in following operations S1-S4.

S1: When the second server issues a control instruction to the object platform through the sensing network platform, the second server classifies the control instruction according to a communication protocol of an object receiving the control instruction.

S2: The second server sends classified control instructions to corresponding sub-platforms of the sensing network platform and stores the classified control instructions in databases of the sub-platforms, respectively.

S3: The sub-platforms compile received data according to a compile rule configured in the sub-platforms and sends the compiled data to the general platform.

S4: The general platform processes the compiled data and sends it to the corresponding production line devices and production line sensors of the object platform.

In one embodiment, the general platform may be configured with a process table corresponding to a process of the object platform; the process table represents the corresponding relationship between stages of the process and the production line devices of the object platform.

When the general platform receives the compiled data sent by the sub-platforms, the general platform may sort the compiled data according to the process table and generate a compile instruction sequence; each compiled data in the compile instruction sequence corresponds to a time when each compiled data is issued to the corresponding production line device.

The general platform issues the compiled data to the corresponding production line device according to the time in the compile instruction sequence.

In one embodiment, the process table may be configured with the time differences of the same product reaching different production line device.

The general platform takes the production line device that the product initially passes as a baseline device, and takes a time when the product passes the baseline device as a baseline time.

The general platform generates, according to the baseline time and the time differences, a time when each of the compiled data is issued to each corresponding production line device and takes the time as an issuing time for each production line device.

The general platform issues each of the compiled data to the corresponding production line device according to the issuing time.

In some embodiments, the each of the compiled data to the corresponding production line device according to the issuing time may include setting issuing caches in the sensing network platform (such as the sub-platforms and/or the general platform). The issuing caches may be used to store the to-be issued data of the corresponding production line devices. An issuing cache may include a time trigger and a conditional trigger. The general platform may issue the compiled data and other issuing information to different issuing caches. Different issuing caches corresponds to different production line devices. Other issuing information includes corresponding time information and trigger conditions. The time trigger and conditional trigger processes the corresponding time information and issuing information of the corresponding trigger condition, respectively. The time information may include the issuing time and information related to the issuing time. The information related to the issuing time may be an interval time between the issuing time and a certain trigger condition.

In some embodiments, the trigger condition may include that a production line device completes the production of a specific component, or a production line device completes the production of a preset number of a certain type of components. In some embodiments, the production line device includes a detection device, which may be configured to detect the quality of the products produced by the production line device. The trigger condition may be a condition that a detection result of a detection device meets a preset condition, or may be other conditions. For example, the trigger condition may be a combination of a plurality of conditions.

In some embodiments, the trigger condition may be at least one of that the production line device completes the production of a preset number of a certain type of components and the detection result of the detection device meets the preset condition.

In some embodiments, the issuing cache may obtain the relevant information required for the triggering condition in various ways. For example, the relevant information required for the triggering condition may be distributed by the general platform.

In some embodiments, when the general platform is issuing the to-be issued data, it may further issue a trigger instruction to a relevant production line device. The relevant production line device may be a device corresponding to the trigger condition in the to-be issued data.

In some embodiments, the trigger instruction may include an address of corresponding issuing cache in the sensing network platform. The production line device may send the detected relevant information to the corresponding issuing cache according to the address in the trigger instruction.

In some embodiments, according to the time trigger and the conditional trigger, when the condition in other issuing information is met, the issuing cache may issue the data to the corresponding production line device.

In some embodiments of the present disclosure, data issuing may be more reliable through controlling the conditions. In some embodiments of the present disclosure, through pre-storing the address of the issuing cache, the transferring of the relevant information may be more direct and timelier, and may reduce the burden of the system as well.

In one embodiment, when the object platform transfers the production line data detected by the production line sensors in the object platform to the second server through the sensing network platform, the general platform in the sensing network platform receives the production line data.

The general platform establishes the corresponding relationship between the production line devices and the production line data according to the process table, and sends the production line data to corresponding sub-platforms according to the corresponding relationship.

The sub-platform decodes the received production line data and sends it to the second server.

In one embodiment, when the second server receives the decoded production line data, it sends the data to the first server.

The first server integrates the decoded production line data, forms a production data set, and sends the production data set to the terminal device.

Those skilled in the art may realize that the exemplary units and algorithm operations described in the embodiments of the present disclosure may be implemented through electronic hardware, computer software or the combination of the both. To clarify the interchangeability of the hardware and the software, the above has already generally described the components and operations of each embodiment according to their functions. Whether these functions may be performed with hardware or software depends on the specific application and the designed constraints of the technical solution. Professional and technical personnel may adopt different modes on each specific application to implement the described functions, but the implementation should not be considered to exceed the scope of the present disclosure.

In some embodiments provided by the present disclosure, it should be understood that the devices and methods disclosed may be implemented in other ways. For example, the above descripted embodiments of the devices are merely for illustration. For example, the division of the units may only be a logical function division. In practice, there may be other dividing ways. For example, a plurality of units or components may be combined or integrated to another system, or some of their features may be ignored or not performed. In addition, the coupling, direct coupling or communication connection between each other displayed or discussed may be the indirect coupling or communication connection through some interfaces, devices or units, and it may be electric connection, mechanic connection, or connection in other forms.

The units that are described as a separate part may be separated physically or not. Obviously, those skilled in the art may realize that the exemplary units and algorithm operations described in the embodiments of the present disclosure may be implemented through electronic hardware, computer software or the combination of the both. To clarify the interchangeability of the hardware and the software, the above has already generally described the components and operations of each embodiment according to their functions. Whether these functions will be performed with hardware or software depends on the specific application and the designed constraints of the technical solution. Those skilled in the art may adopt different modes on each specific application to implement the described functions, but the implementation should not be considered to exceed the scope of the present disclosure.

In addition, each functional unit of each embodiment of the present disclosure may be integrated in one processing unit, or each unit may physically exist independently, or two or more than two units may be integrated in one unit. The above-mentioned integrated units may be implemented in the form of hardware or the form of software functional units.

When the integrated unit is implemented in the form of software functional unit and used/sold as independent product, it may be stored in a computer readable storage medium. Based on this understanding, the essence, or the parts that contribute to the existing art, or all of/part of the technical solution of the present disclosure may be embodied in the form of software product. The computer software product may be stored in a storage medium and may include several instructions to enable a computer device (such as a personal computer, a server, or a network device, etc.) to perform all or part of the operations described in each embodiment of the present disclosure. The aforementioned storage medium may include: a U disk, a mobile hard disk, a read-only memory (ROM), a random-access memory (RAM), a disk or a CD, etc.

The specific embodiments described above have further explained the purpose, technical solution, and beneficial effects of the present disclosure. What should be understood is that the above-mentioned are only the specific implementation modes of the instructions. The protection range of the present disclosure shall not be limited, any modifications, equivalent replacements, improvements, etc. within the spirit and principles of the present disclosure should be included within the protection range of the present disclosure.

We claim:

1. Industrial internet of things (IoT) with a sensing network platform in a post-sub-platform type, comprising: a user platform, a service platform, a management platform, a sensing network platform, and an object platform that interact in turn, wherein:
   the user platform is configured as a terminal device and interacts with a user;
   the service platform is configured as a first server to receive an instruction of the user platform and send the instruction to the management platform, to extract and process information required by the user platform from the management platform, and send the information to the user platform;
   the management platform is configured as a second server to control the operation of the object platform, and to receive feedback data of the object platform;
   the sensing network platform is configured as a communication network and gateway for the interaction between the object platform and the management platform;
   the object platform is configured as production line devices and production line sensors that perform production;
   the service platform and the management platform adopt centralized layout, which means that any platform uniformly receives, processes, and sends data; the sensing network platform adopts post-sub-platform layout, which means that the sensing network platform is configured with a general platform and a plurality of sub-platforms, the plurality of sub-platforms respectively store and process data of different types or data of different receiving objects sent by the management platform, and the general platform summarizes and processes data of the plurality of sub-platforms, and transmits the data to the object platform;
   when the second server issues a control instruction to the object platform through the sensing network platform, the second server classifies the control instruction to obtain classified control instructions according to a communication protocol of an object receiving the control instruction;
   the second server sends the classified control instructions to corresponding sub-platforms of the sensing network platform and stores the classified control instructions in databases of the sub-platforms, respectively;
   the sub-platforms compile received data according to a compile rule configured in the sub-platforms and sends the compiled data to the general platform; and the general platform processes the compiled data and sends it to the corresponding production line devices and production line sensors of the object platform.

2. The industrial IoT with the sensing network platform in the post-sub-platform type of claim 1, wherein the general platform is configured with a process table corresponding to a process of the object platform; the process table represents a corresponding relationship between stages of the process and the production line devices of the object platform;

when the general platform receives the compiled data sent by the sub-platforms, the general platform sorts the compiled data according to the process table and generates a compile instruction sequence, each of the compiled data in the compile instruction sequence corresponding to a time when each of the compiled data is issued to the corresponding production line device; and the general platform issues, according to the time in the compile instruction sequence, each of the compiled data to the corresponding production line device.

3. The industrial IoT with the sensing network platform in the post-sub-platform type of claim 2, wherein the process table is configured with time differences of a same product reaching different production line devices;

the general platform takes a production line device that the product initially passes as a baseline device, and takes a time when the product passes the baseline device as a baseline time;

the general platform generates, according to the baseline time and the time differences, a time when each of the compiled data is issued to each corresponding production line device and takes the time as an issuing time for each production line device; and the general platform issues each of the compiled data to the corresponding production line device according to the issuing time.

4. The industrial IoT with the sensing network platform in the post-sub-platform type of claim 2, wherein when the object platform transfers production line data detected by the production line sensors of the object platform to the second server through the sensing network platform, the general platform of the sensing network platform receives the production line data;

the general platform establishes, according to the process table, a corresponding relationship between the production line devices and the production line data, and sends the production line data to corresponding sub-platforms according to the corresponding relationship;

each of the sub-platforms decodes the received production line data and sends it to the second server.

5. The industrial IoT with the sensing network platform in the post-sub-platform type of claim 4, wherein when the second server receives the decoded production line data, sends the decoded production line data to the first server; and the first server integrates the decoded production line data, forms a production data set, and sends the production data set to the terminal device.

6. A controlling method of industrial internet of things (IoT) with a sensing network platform in a post-sub-platform type, which is applied to a user platform, a service platform, a management platform, a sensing network platform, and an object platform that interact in turn, wherein:

the user platform is configured as a terminal device and interacts with a user;

the service platform is configured as a first server to receive an instruction of the user platform and send the instruction to the management platform, to extract and process information required by the user platform from the management platform, and send the information to the user platform;

the management platform is configured as a second server to control the operation of the object platform, and to receive the feedback data of the object platform;

the sensing network platform is configured as a communication network and gateway for the interaction between the object platform and the management platform;

the object platform is configured as production line devices and production line sensors that perform production;

the service platform and the management platform adopt centralized layout, which means that any platform uniformly receives, processes, and sends data; the sensing network platform adopts post-sub-platform layout, which means that the sensing network platform is configured with a general platform and a plurality of sub-platforms, the plurality of sub-platforms respectively store and process the data of different types or data of different receiving objects sent by the management platform, and the general platform summarizes and processes the data of the plurality of sub-platforms, and transmits data to the object platform; and the method comprises:

when the second server issues a control instruction to the object platform through the sensing network platform, classifying, by the second server, the control instruction to obtain classified control instructions according to a communication protocol of an object receiving the control instruction;

by the second server, sending the classified control instructions to corresponding sub-platforms of the sensing network platform and storing the instructions in databases of the sub-platforms, respectively;

by the sub-platforms, compiling received data according to a compile rule configured in the sub-platforms and sending the compiled data to the general platform; and by the general platform, processing the compiled data and sending it to the corresponding production line devices and the production line sensors of the object platform.

7. The controlling method of claim 6, wherein the general platform is configured with a process table corresponding to a process of the object platform, the process table represents a corresponding relationship between stages of the process and the production line devices of the object platform;

when the general platform receives the compiled data sent by the sub-platforms, the general platform sorts the compiled data according to the process table and generates a compile instruction sequence, each of the compiled data in the compile instruction sequence corresponding to a time when each of the compiled data is issued to the corresponding production line device; and the general platform issues, according to the time in the compile instruction sequence, each of the compiled data to the corresponding production line device.

8. The controlling method of claim 7, wherein the process table is configured with time differences of a same product reaching different production line devices;

the general platform takes a production line device that the product initially passes as a baseline device, and takes a time when the product passes the baseline device as a baseline time;

the general platform generates, according to the baseline time and the time differences, a time when each of the compiled data is issued to each corresponding production line device and takes the time as an issuing time for each production line device; and the general platform issues each of the compiled data to the corresponding production line device according to the issuing time.

9. The controlling method of claim 7, wherein when the object platform transfers production line data detected by the production line sensors of the object platform to the second server through the sensing network platform, the general platform of the sensing network platform receives the production line data;

the general platform establishes, according to the process table, a corresponding relationship between the production line devices and the production line data, and sends the production line data to corresponding sub-platforms according to the corresponding relationship; and each of the sub-platforms decodes the received production line data and sends it to the second server.

10. The controlling method of claim 9, wherein when the second server receives the decoded production line data, the second server sends the decoded production line data to the first server; and the first server integrates the decoded production line data, forms a production data set, and sends the production data set to the terminal device.

* * * * *